US010787048B2

(12) United States Patent
Ebinuma et al.

(10) Patent No.: US 10,787,048 B2
(45) Date of Patent: Sep. 29, 2020

(54) HOLDING STRUCTURE FOR TIRE AIR PRESSURE DETECTING DEVICE

(71) Applicant: HONDA MOTOR CO., LTD., Minato-ku, Tokyo (JP)

(72) Inventors: Takatoshi Ebinuma, Wako (JP); Masayuki Fujita, Wako (JP); Naoki Kuwabara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 115 days.

(21) Appl. No.: 16/098,898

(22) PCT Filed: Jun. 28, 2016

(86) PCT No.: PCT/JP2016/069157
§ 371 (c)(1),
(2) Date: Nov. 5, 2018

(87) PCT Pub. No.: WO2018/003021
PCT Pub. Date: Jan. 4, 2018

(65) Prior Publication Data
US 2019/0135055 A1    May 9, 2019

(51) Int. Cl.
*B60C 23/04* (2006.01)
*B60C 23/02* (2006.01)

(52) U.S. Cl.
CPC .......... *B60C 23/0498* (2013.01); *B60C 23/02* (2013.01); *B60C 2200/10* (2013.01)

(58) Field of Classification Search
CPC ........................... B60C 23/0498; B60C 23/02
See application file for complete search history.

(56) References Cited

U.S. PATENT DOCUMENTS

| 3,717,030 A * | 2/1973 | McGhee ............... B60C 23/007 |
| | | 73/146.3 |
| 6,247,513 B1 * | 6/2001 | Lukins .................... B60C 23/02 |
| | | 152/427 |

(Continued)

FOREIGN PATENT DOCUMENTS

| CN | 200988402 | 12/2007 |
| CN | 101863200 | 10/2010 |

(Continued)

OTHER PUBLICATIONS

International Search Report and Written Opinion for International Application No. PCT/JP2016/069157 dated Aug. 9, 2016, 9 pgs.

(Continued)

*Primary Examiner* — Clayton E. LaBalle
*Assistant Examiner* — Dennis Hancock
(74) *Attorney, Agent, or Firm* — Amin, Turocy & Watson, LLP (57) ABSTRACT

A holding structure of a tire air pressure detecting device includes a tire air pressure detecting device (23) which is held by a screw shaft (43) of a tire valve (30), a fixing nut (44) which is screwed to the screw shaft (43) and configured to fix the tire valve (40) to a wheel rim (30), a holding sleeve (50) which is screwed to the screw shaft (43) and configured to hold the tire air pressure detecting device (23) on the screw shaft (43), an elastic member (45) which is sandwiched between the tire air pressure detecting device (23) and a device supporting portion (60) including at least one of the fixing nut (44), the holding sleeve (50) and the wheel rim (30) in an axial direction of the screw shaft (43), and a rotation restricting portion (48) which is configured to restrict rotation of the tire air pressure detecting device (23) around the screw shaft (43) between the elastic member (45) and the tire air pressure detecting device (23).

6 Claims, 6 Drawing Sheets

(56) References Cited

U.S. PATENT DOCUMENTS

| | | | |
|---|---|---|---|
| 6,300,867 B1 * | 10/2001 | Rea ........................ | B60C 23/02 340/442 |
| 2006/0075812 A1 | 4/2006 | Luce | |
| 2006/0288924 A1 | 12/2006 | Katou et al. | |

FOREIGN PATENT DOCUMENTS

| | | |
|---|---|---|
| CN | 205086614 | 3/2016 |
| EP | 1911610 | 6/2009 |
| JP | 2007-153298 | 6/2007 |
| JP | 5187710 | 4/2013 |
| JP | 2014-113854 | 6/2014 |
| JP | 2015-039972 | 3/2015 |
| JP | 2015-152168 | 8/2015 |

OTHER PUBLICATIONS

Taiwanese Office Action for Application Serial No. 106114323 dated Dec. 6, 2017, 9 pgs.
Extended European Search Report for European Patent Application No. 16907254.3 dated Dec. 11, 2019.

* cited by examiner

HOLDING STRUCTURE FOR TIRE AIR PRESSURE DETECTING DEVICE

TECHNICAL FIELD

The present invention relates to a holding structure of a tire air pressure detecting device.

BACKGROUND ART

Conventionally, in a holding structure of a tire air pressure detecting device, a technique in which a cutout portion is formed in a surface of a thread cutting sleeve in contact with a tire air pressure detecting device and rotation of the tire air pressure detecting device with respect to the thread cutting sleeve is restricted by cooperation with a box of the tire air pressure detecting device such that the tire air pressure detecting device is prevented from rotating with respect to the thread cutting sleeve which holds the tire air pressure detecting device is known.

However, in the above-described constitution, since the cutout portion is formed in the thread cutting sleeve formed of a metal, there is a problem that manufacturing costs are increased due to the machining work therefor.

RELATED ART DOCUMENT

Patent Document

Patent Document 1: Japanese Patent Publication No. 5187710

SUMMARY

Problems to be Solved by the Invention

The problem to be solved by the present invention is to reduce component manufacturing costs and to stabilize a rotation restricting force of a tire air pressure detecting device in a holding structure of the tire air pressure detecting device.

Means for Solving the Problem

According to the present invention, there is provided a holding structure of a tire air pressure detecting device, including a wheel (29) in which a tire (35) is mounted on a wheel rim (30), a tire valve (40) which is fixed to the wheel rim (30), a tire air pressure detecting device (23) which is held by a screw shaft (43) protruding on an inner side of the tire (35) in the tire valve (40), a fixing nut (44) which is screwed to the screw shaft (43) and configured to fix the tire valve (40) to the wheel rim (30), a holding sleeve (50) which is screwed to the screw shaft (43) and configured to hold the tire air pressure detecting device (23) on the screw shaft (43), an elastic member (45) which is sandwiched between the tire air pressure detecting device (23) and a device supporting portion (60) including at least one of the fixing nut (44), the holding sleeve (50) and the wheel rim (30) in an axial direction of the screw shaft (43), and a rotation restricting portion (48) which is configured to restrict rotation of the tire air pressure detecting device (23) around the screw shaft (43) between the elastic member (45) and the tire air pressure detecting device (23).

Due to such a constitution, since the rotation restricting portion which is configured to restrict the rotation of the tire air pressure detecting device around the screw shaft is provided in the elastic member which floats and supports the tire air pressure detecting device, the elastic member is caused to serve two functions, and it is possible to reduce the number of components, to reduce machine works and to reduce component manufacturing cost. Further, it is possible to minimize scraping or wear of the rotation restricting portion and to stabilize the rotation restricting force by providing the rotation restricting portion in the elastic member.

According to the present invention, the tire air pressure detection device (23) may include a case (24) which accommodates equipment, the case (24) may include a case side rotation restricting portion (28) which engages with the rotation restricting portion (48), one of the rotation restricting portion (48) and the case side rotation restricting portion (28) may include a plurality of concave or convex first fitting portions (48a) arranged in a rotating direction around the screw shaft (43), and the other one of the elastic member (45) and the tire air pressure detecting device (23) may include a convex or concave second fitting portion (28a) capable of being fitted to any one of the plurality of first fitting portions (48a).

In this case, it is possible to easily restrict the relative rotation of the elastic member and the tire air pressure detecting device around the screw shaft at stepwise angles due to concave-convex fitting between the fitting portions of the elastic member and the tire air pressure detecting device.

According to the present invention, the elastic member (45) may be integrally mounted on the fixing nut (44).

In this case, since relative rotation of the elastic member with respect to the fixing nut of the tire valve is impossible, a rotation restricting force of the elastic member around the screw shaft is increased, and a strong holding force of the tire air pressure detecting device in the rotating direction around the screw shaft can be obtained.

According to the present invention, the elastic member (45) may be provided to be spaced apart from the wheel rim (30).

In this case, since the elastic member is disposed with a gap from the wheel rim, even when an external force is applied to the wheel rim, deformation of the rotation restricting portion is minimized, and rotational position restriction by the rotation restricting portion can be satisfactorily performed. Therefore, it is possible to enhance the holding force of the tire air pressure detecting device in the rotating direction.

According to the present invention, the elastic member (45) may include a sandwiched portion (47) which is sandwiched between the tire air pressure detecting device (23) and the device supporting portion (60) in the axial direction of the screw shaft (43), and a fitting portion (46) which engages with the device supporting portion (60) not to allow relative rotation around the screw shaft (43), and the fitting portion (46) may include the rotation restricting portion (48) on an end surface (46a) spaced apart from the tire air pressure detecting device (23) in the axial direction.

In this case, since positioning of the tire air pressure detecting device in the axial direction of the screw shaft (the radial direction of the wheel rim) is performed by the sandwiched portion and the rotation restricting portion is provided on an end surface of the fitting portion which is spaced apart from the tire air pressure detecting means, the rotation restricting portion is prevented from being crushed by the sandwiching between the tire air pressure detecting device and the fixing nut, and the rotational position restriction by the rotation restricting portion can be satisfactorily performed. Therefore, it is possible to enhance the holding force of the tire air pressure detecting device in the rotating direction.

According to the present invention, the tire air pressure detection device (23) may include a case (24) which accommodates equipment, each of the case (24) and the elastic member (45) may be a resin molded product, the rotation restricting portion (48) may be formed on the elastic member (45), and a case side rotation restricting portion (28) which engages with the rotation restricting portion (48) may be formed on the case (24).

In this case, since the rotation restricting portion and the case side rotation restricting portion are respectively formed on the elastic member and the case which are resin molded products, it is possible to reduce the component manufacturing cost as compared with a case in which a metal member is machined to form the rotation restricting portion. In addition, since the rotation restricting portion and the case side rotation restricting portion which are engaged with each other are formed of a resin, it is possible to prevent the rotation restricting portion from being scraped or worn away when the tire air pressure detecting device is rotated, as compared with a conventional one formed of metal.

Advantage of the Invention

According to the present invention, it is possible to reduce the component manufacturing costs and to stabilize the rotation restricting force of the tire air pressure detecting device in the holding structure of the tire air pressure detecting device.

DESCRIPTION OF THE EMBODIMENTS

Hereinafter, an embodiment of the present invention will be described with reference to the drawings. In the following description, the directions such as forward, backward, left and right are the same as those in a vehicle described below unless otherwise noted. Also, in the drawings used for the following description, an arrow FR indicating the front of the vehicle, an arrow LH indicating the left side of the vehicle, and an arrow UP indicating the upper side of the vehicle are shown at appropriate positions.

Figure 1:
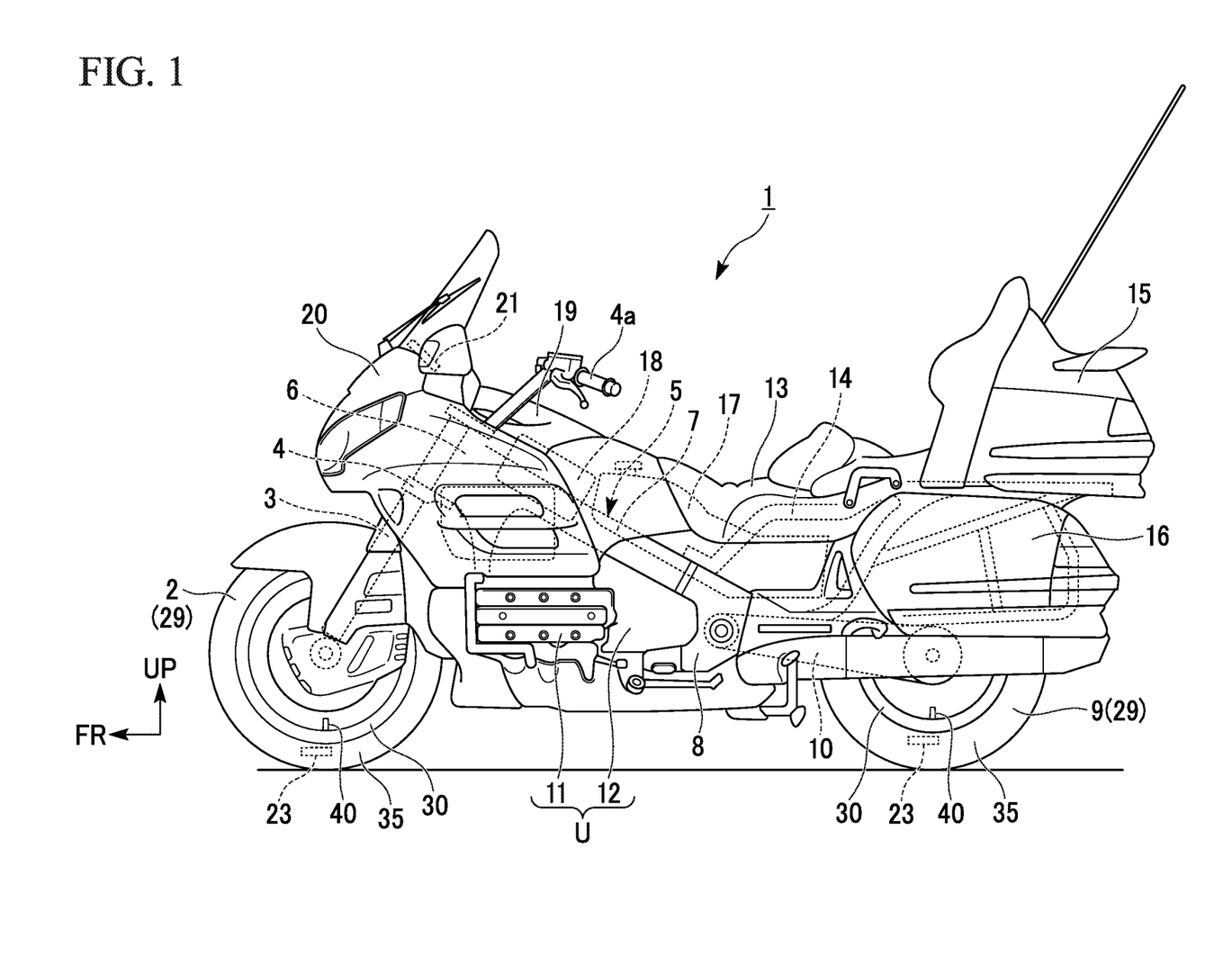
FIG. 1 is a left side view of a motorcycle according to an embodiment of the present invention.

As shown in FIG. 1, this embodiment is applied to a motorcycle (saddle-riding type vehicle) 1 having a large-sized cowling. A front wheel 2 of the motorcycle 1 is pivotally supported at lower ends of a pair of left and right front forks 3. Upper portions of the left and right front forks 3 are supported by a head pipe 6 at a front end of a vehicle body frame 5 via a steering stem 4. A handlebar 4a for steering a front wheel is mounted on an upper portion of the steering stem 4.

In the vehicle body frame 5, a pair of left and right main frames 7 extend obliquely downward and rearward from the head pipe 6. Upper ends of a pair of right and left pivot frames 8 are respectively connected to rear ends of the left and right main frames 7. For example, a power unit U including a horizontally opposed six-cylinder type engine 11 is mounted on a lower side of the left and right main frames 7 and a front side of the left and right pivot frames 8.

A front end of a swing arm 10 which pivotally supports a rear wheel 9 is supported by the left and right pivot frames 8. The swing arm 10 is a cantilever type which pivotally supports the rear wheel 9 at a rear end of a hollow right arm. A drive shaft (not shown) extending from a transmission 12 of the power unit U is inserted into the right arm of the swing arm 10. The power unit U and the rear wheel 9 can transmit power via the drive shaft.

A front end of a rear frame 14 is connected to rear portions of the right and left pivot frames 8. A seat 13 for occupant seating is disposed above the rear frame 14. A rear trunk 15 is disposed behind the seat 13. Left and right saddle bags 16 are disposed on both lower sides of a rear portion of the seat 13, respectively. A fuel tank 17 is disposed below the seat 13. An air cleaner box 18 is disposed in front of the fuel tank 17. A top shelter 19 is disposed above the fuel tank 17 and the air cleaner box 18. A front portion of a vehicle body of the motorcycle 1 is covered with a front cowl 20. A meter panel 21 including various instruments is disposed inside the front cowl 20.

Figure 2:
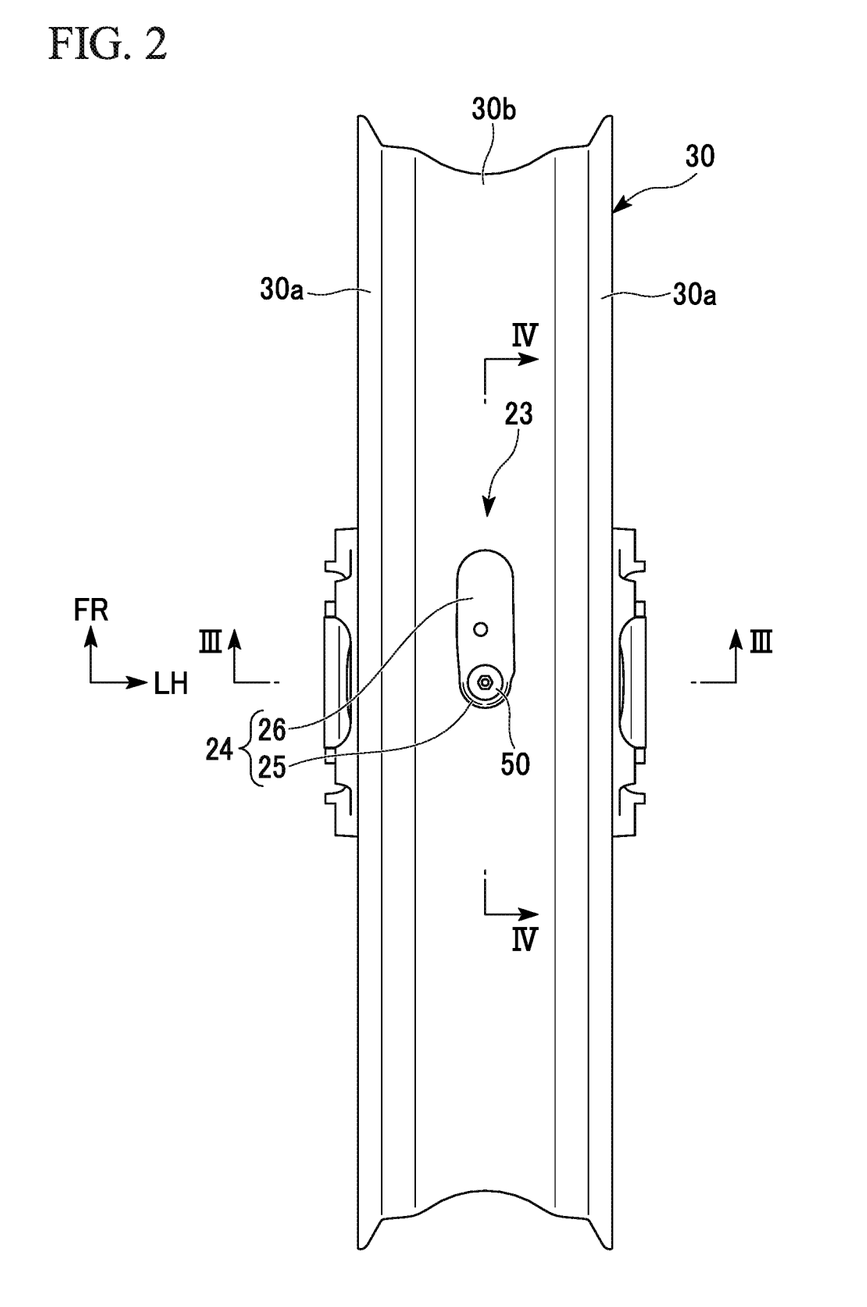
FIG. 2 is a side view of a portion of a wheel rim of the motorcycle on which a tire air pressure detecting device is mounted when seen in a radial direction of the rim.

Also, referring to FIG. 2, the motorcycle 1 includes a tire air pressure monitoring system which constantly measures an air pressure of tires 35 of the front and rear wheels 2 and 9 and confirms an abnormality of the air pressure of the tires 35 of the front and rear wheels 2 and 9 from an onboard position.

The tire air pressure monitoring system includes a tire air pressure detecting device 23 disposed on each of the front and rear wheels 2 and 9, and a control unit (not shown) disposed at a specific position on the vehicle body supporting the front and rear wheels 2 and 9.

The tire air pressure detecting device 23 includes a tire air pressure sensor, and a transmitter which transmits a signal indicating the air pressure of the tire 35 detected by the tire air pressure sensor (none of which is shown). The tire air pressure detecting device 23 accommodates the tire air pressure sensor and the transmitter in a case 24 which is integrally formed of a resin. A signal transmitted from the transmitter is received by a receiver (not shown) of the control unit. The control unit compares the tire air pressure received by the receiver with a prescribed threshold value. The control unit may perform a prescribed warning display on a warning display unit of the meter panel 21 according to a result of comparison between the tire air pressure and the threshold value, for example.

Hereinafter, a holding structure of the tire air pressure detecting device 23 in the front and rear wheels 2 and 9 will be described. This structure is common to the front and rear wheels 2 and 9, and the front and rear wheels 2 and 9 will be collectively referred to as wheels 29.

Figure 3:
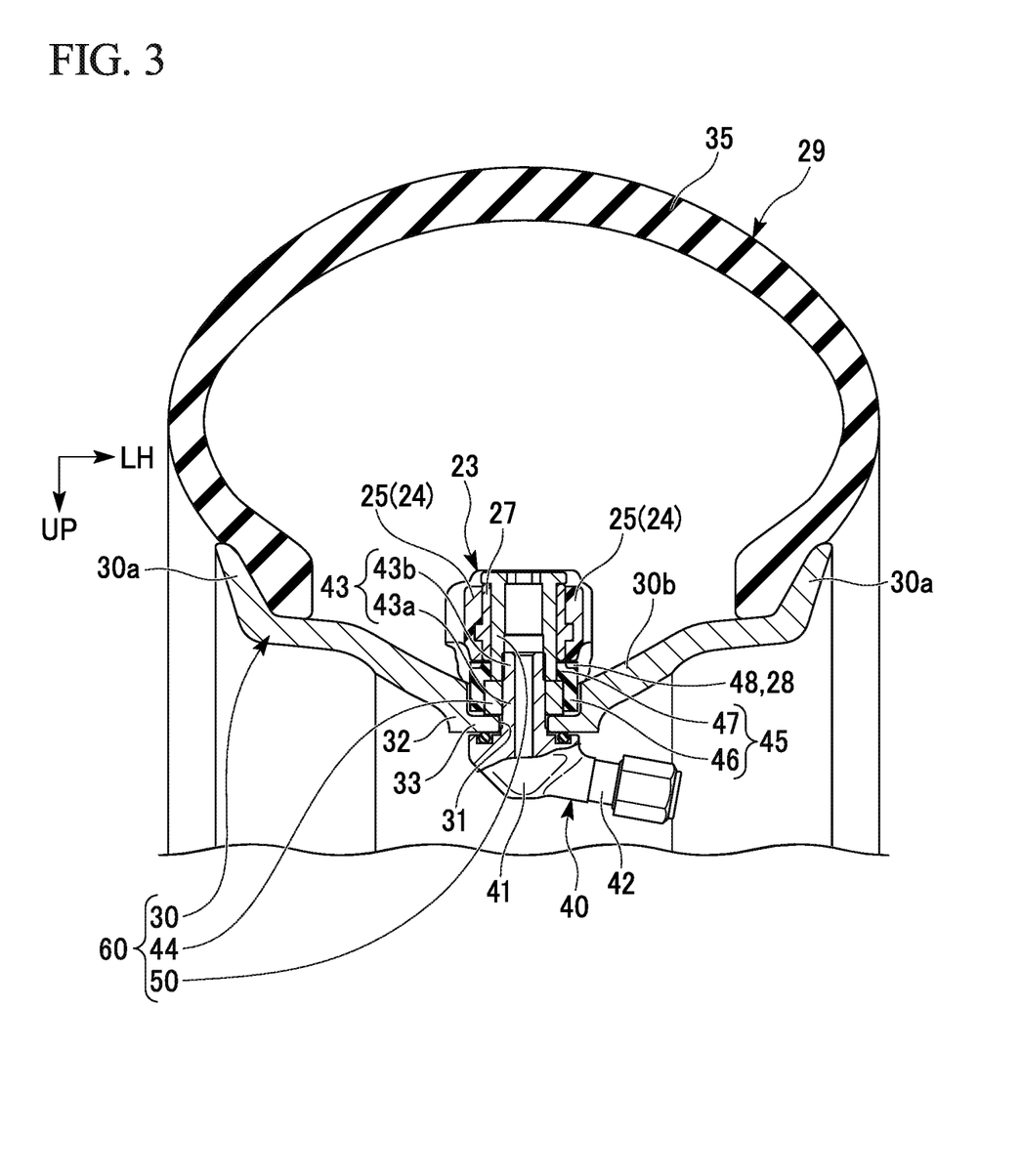
FIG. 3 is a cross-sectional rear view taken along line of FIG. 2.

As shown in FIGS. 2 and 3, in each of the wheels 29, the tire 35 is mounted on an outer circumferential side of an annular wheel rim 30. The wheel rim 30 has a bead holding wall 30a which stands upright from both sides thereof in a width direction (an axle direction, or a rim width direction) toward the outer circumferential side and holds a bead of the tire 35, and a central concave wall 30b formed in an arc shape which is convex toward an inner circumferential side of the wheel rim 30 in a cross-sectional view while being spaced inwardly from both the bead holding walls 30a in the rim width direction.

A valve mounting hole 31 for mounting a tire valve (check valve) 40 is formed at a center of the central concave wall 30b in the rim width direction located at a defined position of the wheel rim 30 in the circumferential direction (circumferential direction of the rim). A circumference of the valve mounting hole 31 is formed into a bottomed tubular cup-shaped portion 32 which protrudes inward in a radial direction of the wheel rim 30 (a rim radial direction) and opens to the outer side in the rim radial direction (the inner side of the tire 35). The valve mounting hole 31 is formed to pass through a center of a bottom wall 33 of the cup-shaped portion 32 in the rim radial direction.

Figure 4:
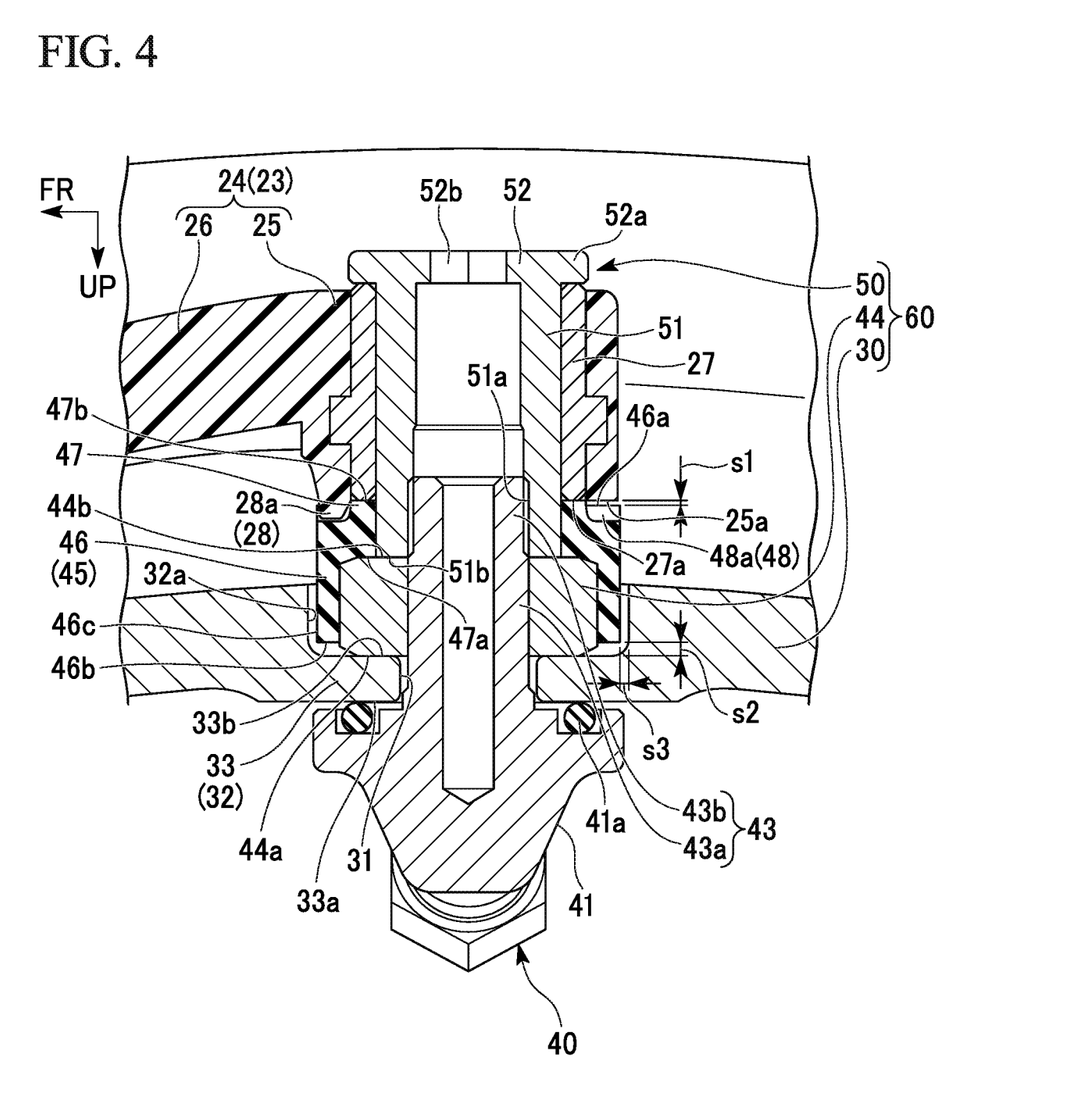
FIG. 4 is a cross-sectional side view taken along line IV-IV of FIG. 2.

Also, referring to FIG. 4, a first mounting seat surface 33a and a second mounting seat surface 33b orthogonal to the rim radial direction are formed on inner and outer sides of the bottom wall 33 of the cup-shaped portion 32 in the rim radial direction.

The tire valve 40 is mounting on the bottom wall 33 of the cup-shaped portion 32 from an inner circumferential side of the wheel rim 30. The tire valve 40 includes a base portion 41 which is in airtight contact with the first mounting seat surface 33a of the bottom wall 33 via an O ring 41a, a valve main body portion 42 which extends obliquely from one side of the base portion 41 in the rim radial direction, and a screw shaft 43 which protrudes from a base end surface facing the bottom wall 33 of the base portion 41 toward an outer circumferential side of the wheel rim 30 (the inner side of the tire) through the valve mounting hole 31.

The screw shaft 43 extends from the base end surface of the base portion 41 to the outer circumferential side of the wheel rim 30 in the rim radial direction. The screw shaft 43 includes a first screw shaft 43a having a relatively large diameter formed on the base portion 41 side, and a second screw shaft 43b having a relatively small diameter formed on the tip end side.

A fixing nut 44 for fixing the tire valve 40 to the wheel rim 30 is screwed to the first screw shaft 43a. The bottom wall 33 is sandwiched between a first end surface 44a on the bottom wall 33 side of the fixing nut 44 and the base end surface of the base portion 41 by the fixing nut 44 being tightened to the first screw shaft 43a, and thus the tire valve 40 is fixed to the wheel rim 30. The fixing nut 44 is disposed to be generally received within the cup-shaped portion 32. An elastic member 45 is integrally mounted on the fixing nut 44.

The second screw shaft 43b protrudes to the inner side of the tire further than a second end surface 44b opposite to the bottom wall 33 of the fixing nut 44 in a state in which the tire valve 40 is fixed to the wheel rim 30 by the fixing nut 44. A cylindrical holding sleeve 50 is screwed to the second screw shaft 43b. The holding sleeve 50 has a bottomed tubular shape which opens to the fixing nut 44 side. The holding sleeve 50 has a cylindrical circumferential wall 51, and a bottom wall 52 provided on the circumferential wall 51 side opposite to the fixing nut 44. A female screw 51a screwed to the second screw shaft 43b is formed on an inner circumferential portion of the circumferential wall 51 on the fixing nut 44 side.

A flange portion 52a which extends outward from the circumferential wall 51 is formed on an outer circumferential side of the bottom wall 52. A hexagonal hole 52b is formed in a center of the bottom wall 52 to allow the holding sleeve 50 to be tightened by a tool. The tire valve 40 communicates with a space inside the tire through an inner space of the hexagonal hole 52b and the holding sleeve 50.

In the holding sleeve 50, the circumferential wall 51 is inserted through a base portion 25 of the case 24 of the tire air pressure detecting device 23, and the female screw 51a of the circumferential wall 51 is screwed onto the second screw shaft 43b. The holding sleeve 50 is tightened until a third end surface 51b of the circumferential wall 51 on the fixing nut 44 side is brought into contact with the second end surface 44b of the fixing nut 44. The tire air pressure detecting device 23 is mounted on the screw shaft 43 of the tire valve 40 inside the tire by this holding sleeve 50.

The case 24 of the tire air pressure detecting device 23 includes the base portion 25 through which the holding sleeve 50 is inserted, and an extending portion 26 which extends from one side of the base portion 25 in a direction intersecting an axial direction of the holding sleeve 50 (screw shaft 43). The case 24 is a resin molded product and integrally forms the base portion 25 and the extending portion 26. An insert sleeve 27 through which the holding sleeve 50 is inserted is inserted in the base portion 25. The tire air pressure sensor and the transmitter are accommodated in the extending portion 26. A detection hole 24a (refer to FIG. 2) for detecting the air pressure is formed in the case 24.

The insert sleeve 27 is disposed on the outer side in the rim radial direction (the side opposite to the fixing nut 44) parallel to a collar portion 47 of the elastic member 45 mounted on the fixing nut 44. The insert sleeve 27 and the collar portion 47 are sandwiched between the fixing nut 44 and the flange portion 52a in a state in which the holding sleeve 50 is tightened until it comes into contact with the fixing nut 44. The collar portion 47 is sandwiched between the insert sleeve 27 and the fixing nut 44. The insert sleeve 27 and the tire air pressure detecting device 23 are biased toward a side opposite to the fixing nut 44 (the inner side of the tire) in the rim radial direction by the collar portion 47 of the elastic member 45.

The tire air pressure detecting device 23 is held at a position spaced apart from the wheel rim 30 toward the inner side of the tire in an axial direction of the screw shaft 43 (a screw shaft direction and the rim radial direction). The tire air pressure detecting device 23 is in a floating support state capable of being elastically displaced toward the fixing nut 44 side in the screw shaft direction.

The tire air pressure detecting device 23 is in the floating support state with respect to a device supporting portion 60 and the wheel rim 30 due to the elastic member 45 being sandwiched between the tire air pressure detecting device 23 and a device supporting portion 60 including at least one of the fixing nut 44, the holding sleeve 50 and the wheel rim 30. The device supporting portion 60 of the embodiment is constituted with the fixing nut 44.

The tire air pressure detecting device 23 is disposed so that a lengthwise direction of the extending portion 26 extends in the circumferential direction of the wheel rim 30 and the extending portion 26 is directed substantially parallel to a wheel rotating direction during running of the vehicle. The tire air pressure detecting device 23 is disposed to at least partially enter the inner side of the central concave wall 30b of the wheel rim 30.

The elastic member 45 includes an outer fitting tubular portion 46 fitted onto the fixing nut 44, and the collar portion 47 provided on the inner circumferential side of an end of the outer fitting tubular portion 46 located on the side opposite to the fixing nut 44. An inner circumferential surface of the outer fitting tubular portion 46 is formed in a hexagonal shape matching an outer circumferential surface of the fixing nut 44. The collar portion 47 is sandwiched between a fourth end surface 27a of the insert sleeve 27 on the fixing nut 44 side and the second end surface 44b of the fixing nut 44. The collar portion 47 is provided to be offset from the outer fitting tubular portion 46 toward the inner side of the holding sleeve 50 in the radial direction.

The elastic member 45 is mounted on the fixing nut 44 not to allow relative rotation. In other words, the fixing nut 44 is embedded in the elastic member 45. The fixing nut 44 is embedded in the elastic member 45 from one side in the axial direction. Therefore, the axial direction can be determined when an assembly of the fixing nut 44 and the elastic member 45 is assembled on the screw shaft 43, and assembling workability of the fixing nut 44 and the elastic member 45 is improved.

The elastic member 45 is a resin molded product formed of, for example, an elastic material such as synthetic rubber and integrally forms the outer fitting tubular portion 46 and the collar portion 47. The elastic member 45 may be a molded product into which the fixing nut 44 is inserted.

The collar portion 47 has an annular shape and is fitted onto the circumferential wall 51 of the holding sleeve 50. The second end surface 44b of the fixing nut 44 is in contact with a fifth end surface 47a of the collar portion 47 on the fixing nut 44 side, and the fourth end surface 27a of the insert sleeve 27 is in contact with a sixth end surface 47b of the collar portion 47 opposite to the fixing nut 44. The collar portion 47 protrudes outward in the rim radial direction (the side opposite to the fixing nut 44) further than a seventh end surface 46a of the outer fitting tubular portion 46 on the outer side in the rim radial direction.

The seventh end surface 46a of the outer fitting tubular portion 46 is spaced apart from an eighth end surface 25a of the base portion 25 of the case 24 on the fixing nut 44 side in the screw shaft direction. The eighth end surface 25a of the base portion 25 of the case 24 is provided to be substantially flush with the fourth end surface 27a of the insert sleeve 27. A reference numeral s1 in the drawing indicates a gap between the seventh end surface 46a of the outer fitting tubular portion 46 and the eighth end surface 25a of the base portion 25 of the case 24. The tire air pressure detecting device 23 is supported on the wheel 29 side via the elastic member 45 so that vibration transmission and heat transmission from the wheel 29 are minimized.

Figure 5:
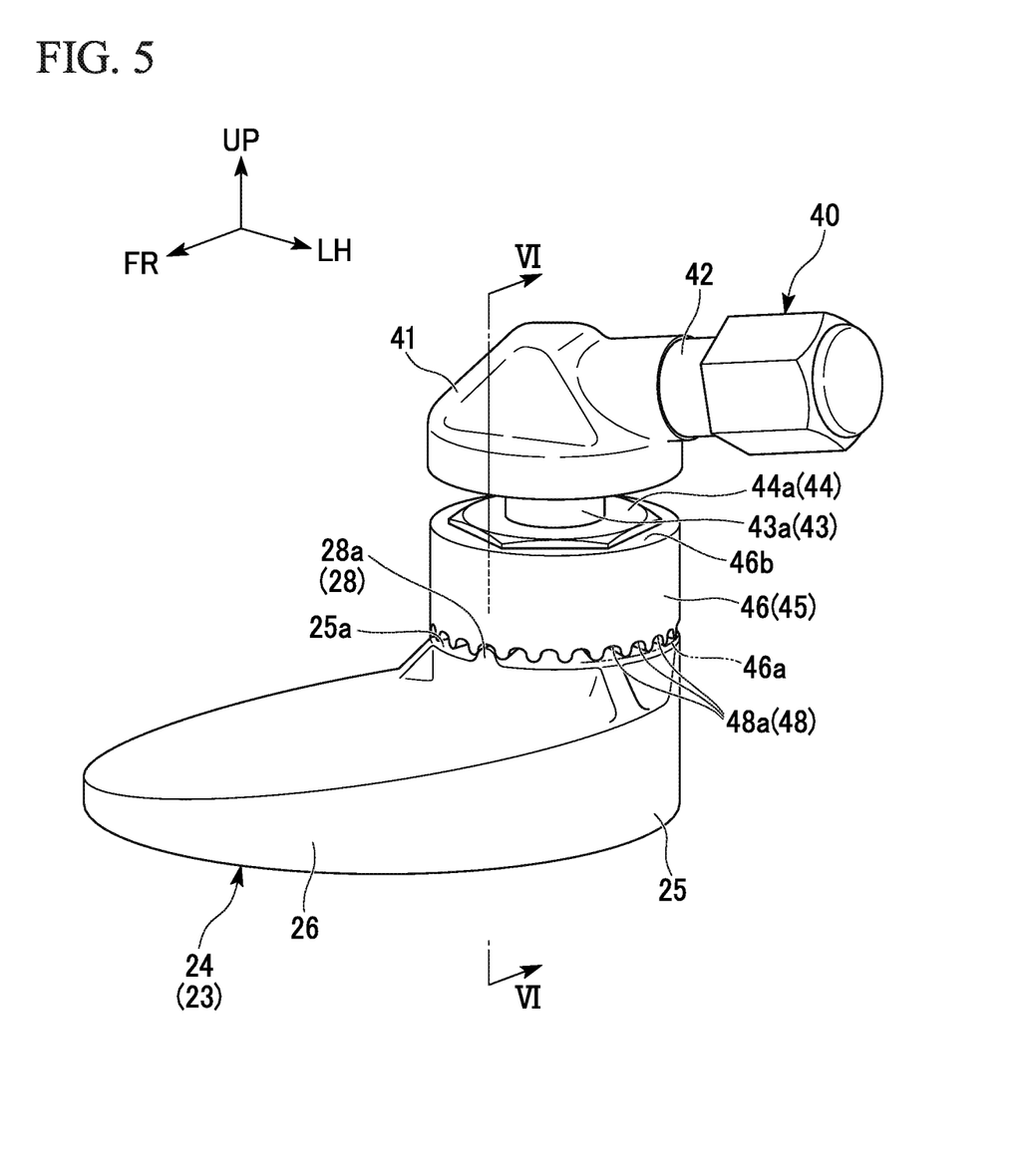
FIG. 5 is a perspective view of the tire air pressure detecting device.
Figure 6:
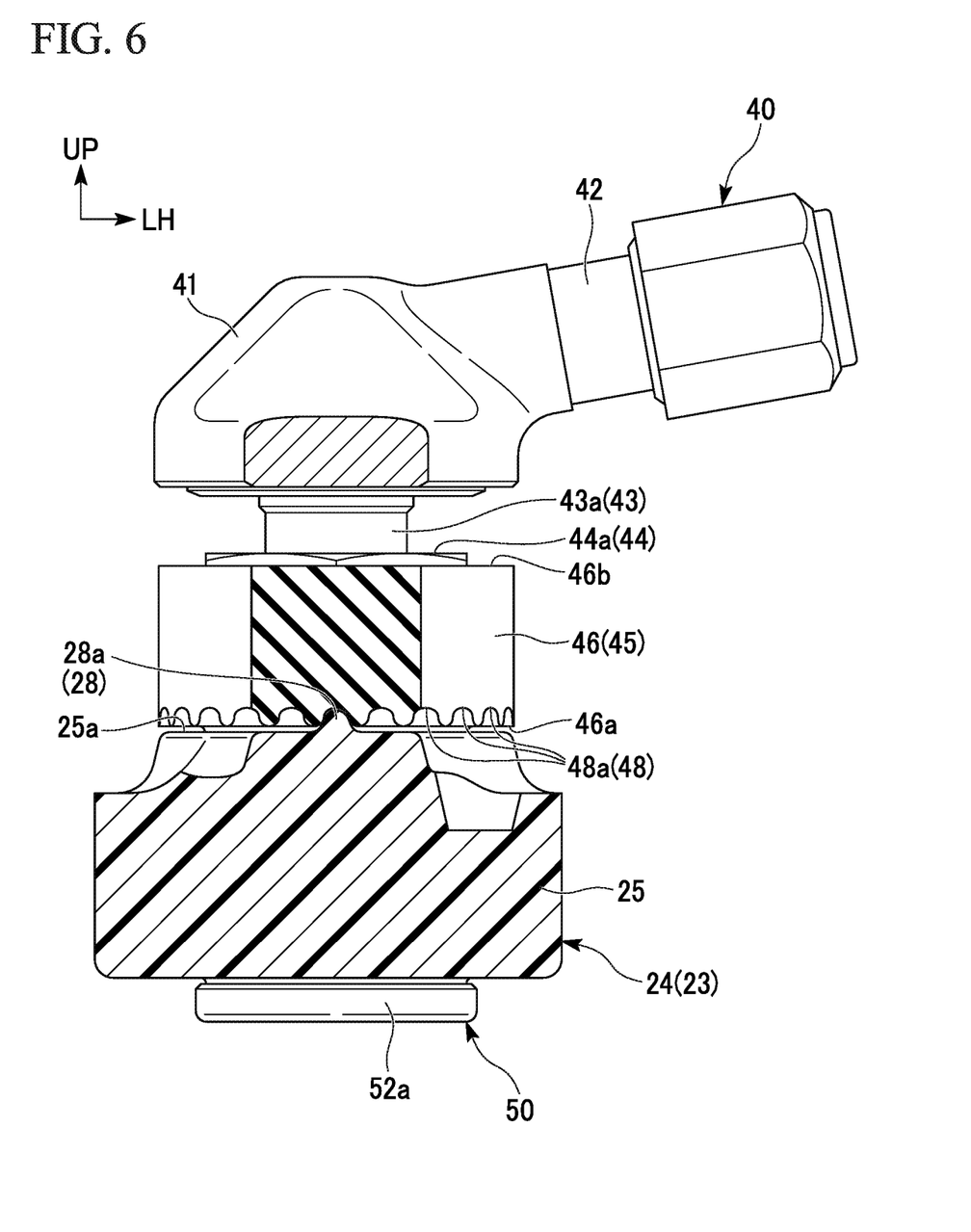
FIG. 6 is a cross-sectional rear view taken along line VI-VI of FIG. 5.

Also, referring to FIGS. 5 and 6, the elastic member 45 includes a rotation restricting portion 48 which is configured to restrict rotation of the tire air pressure detecting device 23 around the screw shaft 43.

The rotation restricting portion 48 is formed on the seventh end surface 46a of the outer fitting tubular portion 46 which is spaced apart from the tire air pressure detecting device 23. The rotation restricting portion 48 includes a plurality of fitting concave portions 48a arranged in the circumferential direction of the outer fitting tubular portion 46 (a rotating direction around the screw shaft 43). The plurality of fitting concave portion 48a are formed to be continuous in the circumferential direction of the outer fitting tubular portion 46 and to form a waveform as a whole. The plurality of fitting concave portion 48a can engage with fitting convex portions 28a provided in the tire air pressure detecting device 23. The plurality of fitting concave portions 48a are provided over the entire circumference of the outer fitting tubular portion 46 in the circumferential direction.

The fitting concave portions 48a may be provided over part of the outer fitting tubular portion 46 in the circumferential direction thereof.

The case 24 of the tire air pressure detecting device 23 includes a case side rotation restricting portion 28 which engages with the rotation restricting portion 48 of the elastic member 45.

The case side rotation restricting portion 28 is formed on the eighth end surface 25a of the base portion 25 of the case 24 which is separated from the outer fitting tubular portion 46 of the elastic member 45. The case side rotation restricting portion 28 includes a fitting convex portion 28a which can be fitted to any one of the plurality of fitting concave portions 48a. A single fitting convex portion 28a is provided at a defined position in the rotating direction around the screw shaft 43. The fitting convex portion 28a may be provided at a plurality of positions in the rotating direction around the screw shaft 43. In this case, a rotation restricting force of the tire air pressure detecting device 23 is increased. Although a smaller number of fitting convex portions 28a than the number of the fitting concave portions 48a may be provided, the same or a larger number of fitting convex portions 28a than the number of fitting concave portions 48a may be provided. A tip end of the fitting convex portion 28a is chamfered into a round shape so that insertion and removal of the elastic member 45 into/from the respective fitting concave portions 48a are performed smoothly. Similarly to the fitting convex portion 28a, a tip end of a convex portion between the plurality of fitting concave portions 48a of the elastic member 45 is also chamfered into a round shape.

The rotation restricting portion 48 and the case side rotation restricting portion 28 which are engaged with each other are respectively formed in the elastic member 45 and the case 24 which are resin molded products. The rotation restricting portion 48 and the case side rotation restricting portion 28 engage with each other under a biasing force of the elastic member 45 and restrict the rotation of the tire air pressure detecting device 23 around the screw shaft 43. Since the rotation restricting portion 48 is formed on the elastic member 45, when a rotational position of the tire air pressure detecting device 23 around the screw shaft 43 is adjusted, scraping or wear of the rotation restricting portion 48 and the case side rotation restricting portion 28 are minimized, and adjustment of the rotational position of the tire air pressure detecting device 23 is smooth.

The elastic member 45 (the outer fitting tubular portion 46) causes a ninth end surface 46b and an outer circumferential surface 46c on the inner side in the rim radial direction to be spaced apart from an inner circumferential surface 32a and the second mounting seat surface 33b of the bottom wall 33 of the cup-shaped portion 32. In the drawing, a reference numeral s2 indicates a gap between the ninth end surface 46b of the elastic member 45 (the outer fitting tubular portion 46) and the second mounting seat surface 33b of the bottom wall 33 of the cup-shaped portion 32, and a reference numeral s3 indicates a gap between the outer circumferential surface 46c of the elastic member 45 (the outer fitting tubular portion 46) and the inner circumferential surface 32a of the cup-shaped portion 32.

The first end surface 44a of the fixing nut 44 is in contact with the second mounting seat surface 33b of the bottom wall 33, whereas the ninth end surface 46b of the outer fitting tubular portion 46 is spaced apart from the second mounting seat surface 33b of the bottom wall 33. In other words, the elastic member 45 causes an end of the fixing nut 44 on the bottom wall 33 side to protrude from the outer fitting tubular portion 46.

As the elastic member 45 is spaced apart from the wheel rim 30, the elastic member 45 is less likely to receive a load from the wheel rim 30, and deformation of the rotation restricting portion 48 is minimized. The deformation of the rotation restricting portion 48 can also be minimized by preventing the elastic member 45 from interfering with a fillet portion of the cup-shaped portion 32.

As described above, the holding structure of the tire air pressure detecting device 23 according to the embodiment includes the wheel 29 in which the tire 35 is mounted on the wheel rim 30, the tire valve 40 which is fixed to the wheel rim 30, the tire air pressure detecting device 23 which is held by the screw shaft 43 protruding on the inner side of the tire 35 in the tire valve 40, the fixing nut 44 which is screwed to the screw shaft 43 and fixes the tire valve 40 to the wheel rim 30, the holding sleeve 50 which is screwed to the screw shaft 43 and holds the tire air pressure detecting device 23 on the screw shaft 43, and the elastic member 45 which is sandwiched between the tire air pressure detecting device 23 and the fixing nut 44 in an axial direction of the screw shaft 43 and brings the tire air pressure detecting device 23 into a floating support state, wherein the elastic member 45 includes the rotation restricting portion 48 which engages with the tire air pressure detecting device 23 and restricts the rotation of the tire air pressure detecting device 23 around the screw shaft 43.

Due to such a constitution, since the rotation restricting portion 48 which is configured to restrict the rotation of the tire air pressure detecting device 23 around the screw shaft 43 is provided in the elastic member 45 which floats and supports the tire air pressure detecting device 23, the elastic member 45 is caused to serve two functions, and it is possible to reduce the number of components, to reduce machine works and to reduce component manufacturing cost. Further, it is possible to minimize scraping or wear of the rotation restricting portion 48 and to stabilize the rotation restricting force by providing the rotation restricting portion 48 in the elastic member 45.

Further, in the holding structure of the tire air pressure detecting device 23 according to the embodiment, the tire air pressure detecting device 23 includes the case 24 which accommodates equipment, the case 24 includes the case side rotation restricting portion 28 which engages with the rotation restricting portion 48, the rotation restricting portion 48 includes the plurality of fitting concave portions 48a arranged in a rotating direction around the screw shaft 43, and the case side rotation restricting portion 28 includes the fitting convex portion 28a capable of being fitted to any one of the plurality of fitting concave portions 48a.

Due to such a constitution, it is possible to easily restrict the relative rotation of the elastic member 45 and the tire air pressure detecting device 23 around the screw shaft 43 at a stepwise angle due to concave-convex fitting between the fitting concave portion 48a and the fitting convex portion 28a of the elastic member 45 and the tire air pressure detecting device 23.

Further, in the holding structure of the tire air pressure detecting device 23 according to the embodiment, the elastic member 45 is integrally mounted to the fixing nut 44.

Due to such a constitution, since relative rotation of the elastic member 45 with respect to the fixing nut 44 of the tire valve 40 is impossible, the rotation restricting force of the elastic member 45 around the screw shaft 43 is increased, and a strong holding force of the tire air pressure detecting device 23 in the rotating direction around the screw shaft 43 can be obtained.

Further, in the holding structure of the tire air pressure detecting device 23 according to the embodiment, the elastic member 45 is provided to be spaced apart from the wheel rim 30.

Due to such a constitution, since the elastic member 45 is disposed with a gap from the wheel rim 30, even when an external force is applied to the wheel rim 30, the deformation of the rotation restricting portion 48 is minimized, and the rotational position restriction by the rotation restricting portion 48 can be satisfactorily performed. Therefore, it is possible to enhance the holding force of the tire air pressure detecting device 23 in the rotating direction.

Further, in the holding structure of the tire air pressure detecting device 23 according to the embodiment, the elastic member 45 includes the collar portion 47 which is sandwiched between the tire air pressure detecting device 23 and the fixing nut 44 in the axial direction of the screw shaft 43, and the outer fitting tubular portion 46 which engages with the fixing nut 44 not to allow relative rotation around the screw shaft 43, and the outer fitting tubular portion 46 includes the rotation restricting portion 48 on the seventh end surface 46a spaced apart from the tire air pressure detecting device 23 in the axial direction.

Due to such a constitution, since positioning of the tire air pressure detecting device 23 in the axial direction of the screw shaft 43 (the radial direction of the wheel rim 30) is performed by the collar portion 47 and the rotation restricting portion 48 is provided on the seventh end surface 46a of the outer fitting tubular portion 46 which is spaced apart from the tire air pressure detecting means, the rotation restricting portion 48 is prevented from being crushed by the sandwiching between the tire air pressure detecting device 23 and the fixing nut 44, and the rotational position restriction by the rotation restricting portion 48 can be satisfactorily performed. Therefore, it is possible to enhance the holding force of the tire air pressure detecting device 23 in the rotating direction.

Further, in the holding structure of the tire air pressure detecting device 23 according to the embodiment, each of the case 24 and the elastic member 45 is a resin molded product, the rotation restricting portion 48 is formed on the elastic member 45, and the case side rotation restricting portion 28 is formed on the case 24.

Due to such a constitution, since the rotation restricting portion 48 and the case side rotation restricting portion 28 are respectively formed on the elastic member 45 and the case 24 which are the resin molded products, it is possible to reduce the component manufacturing cost as compared with a case in which a metal member is machined to form the rotation restricting portion. In addition, since the rotation restricting portion 48 and the case side rotation restricting portion 28 which are engaged with each other are formed of a resin, it is possible to prevent the rotation restricting portion from being scraped or worn away when the tire air pressure detecting device 23 is rotated, as compared with the conventional one formed of metal.

The present invention is not limited to the above-described embodiment and is not limited to, for example, the constitution in which the elastic member is provided between the tire air detecting device and the fixing nut (fixing means), and the elastic member may be sandwiched between the tire air pressure detecting device and the holding sleeve (holding means) or between the tire air pressure detecting device and the wheel rim. The present invention is not limited to the constitution in which the elastic member is integrally mounted to the fixing nut, and the elastic member may be integrally mounted to the holding sleeve. The present invention is not limited to the constitution in which the rotation restricting portion is provided between the case of the tire air pressure detecting device and the elastic member, and the case of the tire air pressure detecting device and the elastic member may be integrally rotatable, and the rotation restricting portion may be provided between the elastic member and the fixing nut. The rotation restricting portion of the elastic member is provided on the outer circumferential side, and the collar portion (sandwiched portion) is provided on the inner circumferential side, but the rotation restricting portion of the elastic member may be provided on the inner circumferential side, and the sandwiched portion may be provided on the outer circumferential side. The rotation restricting portion of the elastic member has the concave portion, and the case side rotation restricting portion of the tire air pressure detecting device has the convex portion, but the rotation restricting portion of the elastic member may have the convex portion, and the case side rotation restricting portion of the tire air pressure detecting device may have the concave portion.

The present invention is not limited to application to the motorcycle but may be applied to any transportation equipment including wheels including four-wheeled automobiles. At this time, it is irrespective of whether it is used for any wheel such as front and rear wheels.

Additionally, the constitution in the above-described embodiment is an example of the present invention, and various modifications such as replacing the elements of the embodiment with well-known elements are possible without departing from the gist of the present invention.

INDUSTRIAL APPLICABILITY

According to the present invention, it is possible to reduce the component manufacturing costs and to stabilize the rotation restricting force of the tire air pressure detecting device in the holding structure of the tire air pressure detecting device.

BRIEF DESCRIPTION OF THE REFERENCE SYMBOLS

1: Motorcycle
23: Tire air pressure detecting device
24: Case
28: Case side rotation restricting portion
28a: Fitting convex portion (second fitting portion)
29: Wheel
30: Wheel rim
35: Tire
40: Tire valve
43: Screw shaft
44: Fixing nut (fixing means)
45: Elastic member (elastic means)
46: Outer fitting tubular portion (engaging portion)
46a: Seventh end surface (end surface)
47: Collar portion (sandwiched portion)
48: Rotation restricting portion
48a: Fitting concave portion (first fitting portion)
50: Holding sleeve (holding means)
60: Device supporting portion

What is claim is:

1. A holding structure of a tire air pressure detecting device, comprising:
    a wheel in which a tire is mounted on a wheel rim;
    a tire valve which is fixed to the wheel rim;
    a tire air pressure detecting device which is held by a screw shaft protruding on an inner side of the tire in the tire valve;
    a fixing nut which is screwed to the screw shaft and configured to fix the tire valve to the wheel rim;
    a holding sleeve which is screwed to the screw shaft and configured to hold the tire air pressure detecting device on the screw shaft; and
    an elastic member which is sandwiched between the tire air pressure detecting device and a device supporting portion including at least one of the fixing nut, the holding sleeve and the wheel rim in an axial direction of the screw shaft, wherein:
    the tire air pressure detecting device is in a floating support state capable of being elastically displaced toward the fixing nut side in the axial direction of the screw shaft,
    the tire air pressure detecting device comprises a case side rotation restricting portion which engages with the elastic member in a case which accommodates equipment, and
    the elastic member comprises a rotation restricting portion which is configured to restrict rotation of the tire air pressure detecting device around the screw shaft by engaging with the case side rotation restricting portion.

2. The holding structure of a tire air pressure detecting device according to claim 1, wherein one of the rotation restricting portion and the case side rotation restricting portion comprises a plurality of concave or convex first fitting portions arranged in a rotating direction around the screw shaft, and
    the other one of the elastic member and the tire air pressure detecting device comprises a convex or concave second fitting portion capable of being fitted to any one of the plurality of first fitting portions.

3. The holding structure of a tire air pressure detecting device according to claim 1, wherein the elastic member is integrally mounted on the fixing nut.

4. The holding structure of a tire air pressure detecting device according to claim 1, wherein the elastic member is provided to be spaced apart from the wheel rim.

5. The holding structure of a tire air pressure detecting device according to claim 1, wherein the elastic member comprises a sandwiched portion which is sandwiched between the tire air pressure detecting device and the device supporting portion in the axial direction of the screw shaft, and a fitting portion which engages with the device supporting portion not to allow relative rotation around the screw shaft, and
    the fitting portion comprises the rotation restricting portion on an end surface spaced apart from the tire air pressure detecting device in the axial direction.

6. The holding structure of a tire air pressure detecting device according to claim 1, wherein: each of the case and the elastic member is a resin molded product,
    the rotation restricting portion is formed on the elastic member, and
    a case side rotation restricting portion which engages with the rotation restricting portion is formed on the case.

* * * * *